(12) United States Patent
Zhong et al.

(10) Patent No.: US 10,274,779 B2
(45) Date of Patent: Apr. 30, 2019

(54) METHOD FOR MANUFACTURING DISPLAY SUBSTRATE, DISPLAY SUBSTRATE, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Guoqiang Zhong, Beijing (CN); Sangman Yuk, Beijing (CN); Bin Li, Beijing (CN); Tao Zhu, Beijing (CN); Huifang Yuan, Beijing (CN); Wenhao Tang, Beijing (CN); Haibin Yin, Beijing (CN); Qun Fang, Beijing (CN); Anxin Dong, Beijing (CN); Jian Chen, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/655,469

(22) Filed: Jul. 20, 2017

(65) Prior Publication Data
US 2018/0024398 A1    Jan. 25, 2018

(30) Foreign Application Priority Data
Jul. 22, 2016    (CN) .......................... 2016 1 0586864

(51) Int. Cl.
*G02F 1/1335*    (2006.01)
*G02F 1/1368*    (2006.01)
*G02F 1/1333*    (2006.01)

(52) U.S. Cl.
CPC .. *G02F 1/133516* (2013.01); *G02F 1/133512* (2013.01); *G02F 1/1368* (2013.01);
(Continued)

(58) Field of Classification Search
CPC ........... G02F 1/133345; G02F 1/13351; G02F 2001/133357; G02F 2001/133519;
(Continued)

(56) References Cited

U.S. PATENT DOCUMENTS

| | | | | |
|---|---|---|---|---|
| 5,838,409 A | * | 11/1998 | Tomono | G02F 1/133345 349/122 |
| 2013/0101748 A1 | * | 4/2013 | Ma | G02B 5/20 427/521 |

FOREIGN PATENT DOCUMENTS

| | | |
|---|---|---|
| CN | 102623226 A | 8/2012 |
| CN | 102654672 A | 9/2012 |

(Continued)

OTHER PUBLICATIONS

Chinese office action dated Aug. 30, 2018 for corresponding application No. 201610586864.5 with English translation attached.

*Primary Examiner* — Angela K Davison
(74) *Attorney, Agent, or Firm* — Nath, Goldberg & Meyer; Joshua B. Goldberg; Daniel Bissing

(57) ABSTRACT

The present disclosure provides a method for manufacturing a display substrate, a display substrate, and a display device. The method for manufacturing a display substrate comprises: providing a container, which is positioned horizontally and which contains a curable liquid, and the bottom of which is flat; immersing a side of the substrate parallel to the bottom of the container in the horizontal direction into the curable liquid; and performing curing treatment of the curable liquid until the curable liquid is solidified on the side of the substrate to form a film layer.

9 Claims, 3 Drawing Sheets

(52) U.S. Cl.
CPC ............ *G02F 2001/133354* (2013.01); *G02F 2001/133357* (2013.01); *G02F 2001/133519* (2013.01); *G02F 2202/023* (2013.01); *G02F 2202/025* (2013.01); *G02F 2202/28* (2013.01)

(58) Field of Classification Search
CPC ......... G02F 2202/0256; H01L 27/1259; H01L 27/1262; H01L 27/1292; H01L 27/1296; G03F 7/0035; G03F 7/16; G03F 7/161; G03F 7/162
See application file for complete search history.

(56) References Cited

FOREIGN PATENT DOCUMENTS

| | | | |
|---|---|---|---|
| CN | 102707356 | A | 10/2012 |
| JP | 4818712 | B2 | 11/2011 |
| TW | 201545849 | A | 12/2015 |

\* cited by examiner

METHOD FOR MANUFACTURING DISPLAY SUBSTRATE, DISPLAY SUBSTRATE, AND DISPLAY DEVICE

FIELD OF THE INVENTION

The present disclosure relates to the field of liquid crystal display technology, and more particularly to a method for manufacturing a display substrate, a display substrate, and a display device.

BACKGROUND OF THE INVENTION

Thin Film Transistor Liquid Crystal Display (TFT-LCD) is an important flat panel display device. The display device generally includes a display panel, which generally comprises an array substrate TFT and a color filter (CF) substrate which are arranged as aligned, wherein the main structure of the color filter substrate (for example, IPS) includes a glass substrate, a ITO conductive film on the back side, a black Matrix (BM), a color resist layer (which includes a red color fitter, a green color fitter and a blue color fitter) RGB, an over coating (OC), and columnar spacer.

However, the conventional method for preparing a color filter substrate has been found the following disadvantages in practice: the uniformity of film thickness of the color filter substrate is poor, and the flatness of the over coating OC is low, and there are various risks during the aligning process with the TFT substrate, causing bad incidence greatly increased.

For this reason, now there is an urgent need for a preparation method capable of satisfying the flatness requirement of the over coating OC and greatly improving the film thickness uniformity of the display substrate (such as a color filter substrate).

SUMMARY OF THE INVENTION

The present disclosure provides a method for manufacturing a display substrate, a display substrate and a display device.

The present disclosure provides a method for manufacturing a display substrate, comprising:
  providing a container, which is positioned horizontally and which contains a curable liquid, and the bottom of which is flat in the horizontal direction;
  immersing a side of the substrate parallel to the bottom of the container in the horizontal direction into the curable liquid; and
  performing curing treatment of the curable liquid until the curable liquid is solidified on the side of the substrate to form a film layer.

For example, a black matrix and a color resist layer are formed on the substrate;
  the side of the substrate being the side where the black matrix and the color resist layer are positioned.

For example, the color resist layer and the black matrix adjacent thereto are overlapped in the edge regions.

For example, the container is provided with an adjustable separator;
  the step of providing a container which is positioned horizontally and which contains a curable liquid comprises:
    providing an empty container;
    adjusting the position of the separator in the container so as to adjust the depth of the curable liquid contained in the container; and
    injecting the curable liquid into the container after being adjusted.

For example, the curable liquid is a curable adhesive.

For example, the step of performing curing treatment of the curable liquid includes:
  performing heat treatment of the curable liquid so as to be cured.

For example, after the step of performing curing treatment of the curable liquid until the curable liquid is solidified on the side of the substrate to form a film layer, it further comprises:
  turning the substrate 180 degrees, followed by a subsequent process.

Accordingly, the present disclosure also provides a display substrate obtained by the manufacturing method of the present disclosure.

Accordingly, the present disclosure also provides a display device including a display substrate which applies the display substrate according to the present disclosure.

For example, the display device includes a liquid crystal display device.

DETAILED DESCRIPTION OF EMBODIMENTS

Figure 1A:
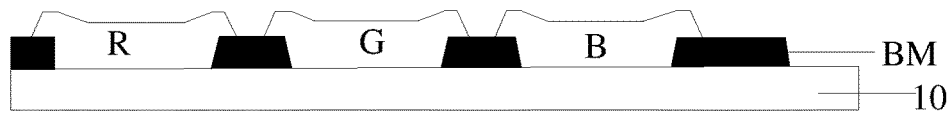
FIG. 1*a* is a schematic diagram of a structure of a display substrate formed with a black matrix and a color resist layer.

In the present disclosure, the term "flat" means that the flatness of the bottom of the container satisfies the actual requirement for the flatness of the surface of the film layer. In particular, flatness is also referred to as evenness, meaning that the surface of an article is not absolutely flat (e.g., there are small bumps, warping and/or irregularities), and the difference value between the uneven and the absolute level is flatness, the value is as smaller as better. It can be measured by three meters straight ruler method, continuous evenness instrument method, bump integrator instrument method or level gauge measurement method. For example, ECHECK's evenness tester can also be used for measurement. In general, in the present disclosure, the flatness should be at least equal to or less than 0.3 μm.

In the present disclosure, the expression "the side of the substrate parallel to the bottom of the container in the horizontal direction" means the side of the substrate on which the film layer is to be formed (hereinafter referred to as "the side on which the film layer to be formed"), which is generally a side on which a film layer structure is formed, and may be the side of a substrate on which the film layer structure is not formed. For a display substrate (e.g., a color filter substrate), it is generally referred to as the side on which the black matrix layer and the color resist RGB layer have been formed on the glass substrate.

In the present disclosure, the term "curable liquid" refers to a class of high molecular polymer suitable for the preparation of OC films. The OC films are coated on a color resist RGB layer. The "curable liquid" is cured by applying a curing treatment to become an OC film layer. The curing treatment includes heating, ultraviolet light irradiation, adding a curing agent, and the like. In the present disclosure, it is preferable to use a heat curing method for the purpose of carrying out convenience and cost saving. In the present disclosure, a material for forming an OC film in the prior art can be used as a curable liquid. For example, useful materials include polyacrylates, polyimides and the like. Preferred OC film materials are those that have good adhesion to other materials on the display substrate (e.g., black matrix (BM) and color resist layer RGB), but have poor adhesion to the inner surface of the container after curing, and therefore, they could be easily and quickly peeled off from the container or the separator provided therein, and firmly adhered to the black matrix (BM) and the color resist layer RGB after curing. Such preferred materials may be, for example, resins, in particular acrylic resins, which are more likely to adhere to BM and RGB materials which are also made of resins.

In the present disclosure, the shape of the container for containing the curable liquid is not particularly limited as long as the shape thereof is matched with the above-described display substrate. The size of the container is preferably the same with or slightly larger than the size of the glass substrate. In addition, the material used for the container may be selected from the viewpoint of chemical resistance, shape stability, smoothness, transparency, etc. Examples thereof may include, for example, glass, metal, alloy, ceramic, plastic, and the like. In the present disclosure, it is preferable to use a container made of alloy.

In the present disclosure, the thickness of the film after curing can be controlled by changing the amount of the OC film material injected into the container, or the thickness of the film after curing can also be controlled by providing an adjustable separator parallel to the bottom of the container, or the thickness of the cured film can also be controlled by varying the descent depth of the glass substrate. In one embodiment, the bottom wall of the container is fluidly and movably connected to the sidewall, thereby the bottom wall enables lifting and lowering. Thus, the bottom wall may serve as the above-mentioned adjustable separator. As a specific embodiment of the bottom wall, the bottom wall of the container may be provided in the form of a piston. In addition, it is liquid-tight between the separator and the container, and the material of the separator may be the same as or different from the material of the container.

The method for manufacturing a display substrate, a display substrate, and a display device provided in the present disclosure will be described in detail with reference to the accompanying drawings in order to provide a better understanding of the technical solutions of the present disclosure by those skilled in the art.

Figure 1B:
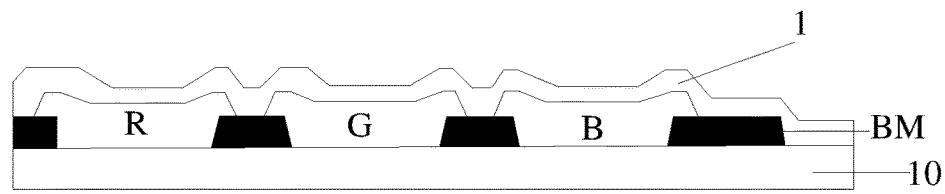
FIG. 1*b* is a schematic view of a structure of a display substrate formed by a conventional method for manufacturing a display substrate.

As shown in FIGS. 1a and 1b, in the prior art, firstly, the exposure process of the black matrix (BM) is performed on the substrate 10, and then the color resist layer RGB is partially overlapped with the black matrix (BM) during the color masking process of the color resist layer RGB, as shown in FIG. 1a, as a result, the angle altitude variance (PW altitude variance) is formed at both ends of the color resist, after which the over coating OC is applied to form the OC layer 1, as shown in FIG. 1b. The film thickness of the formed substrate is not uniform, and flatness is 0.5 µm or more, which can not meet the requirements of flattening.

Figure 2:
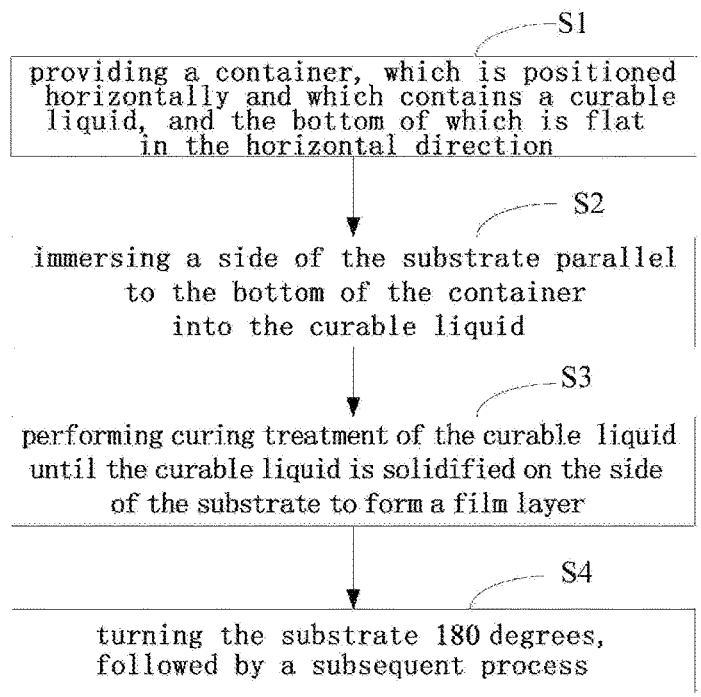
FIG. 2 is a flow chart of a method for manufacturing a display substrate provided in an embodiment of the present disclosure.

FIG. 2 is a flow chart of a method for manufacturing a display substrate according to an embodiment of the present disclosure; see FIG. 2, the method for manufacturing a display substrate according to an embodiment of the present disclosure, comprises the steps of:

S1, providing a container, which is positioned horizontally and which contains a curable liquid, the bottom of said container is flat, and the surface flatness of the container is 0.3 µm.

S2, immersing a side of the substrate parallel to the bottom of the container in the horizontal direction into the curable liquid, wherein "a side of the substrate parallel to the bottom of the container in the horizontal direction" means the side of the glass substrate on which the BM layer and the color resist layer RGB have been formed in the upstream process, that is, in this step, the side on which the OC film layer is to be formed. If the substrate is in a continuous process, the color filter substrate is turned 180 degrees after the color masking process is finished, and then the side on which the BM layer and the color resist layer RGB are formed is immersed in the curable liquid;

S3, the curable liquid is subjected to a curing treatment until the curable liquid is solidified on the side of the substrate to form a film layer. In the present embodiment, the curing treatment is performed by heating the curable liquid.

For example, after step S3, the method for manufacturing a display substrate according to an embodiment of the present disclosure further comprises: Step S4, after curing the curable liquid until the curable liquid is solidified on the side of the substrate to form a film layer, the substrate is turned 180 degrees, followed by a subsequent process, for example, a process of coating the transparent electrode ITO.

For example, the process flow of the manufacturing method of the display substrate according to the preferred embodiment of the present disclosure will be described in detail with reference to FIGS. 3a to 3d and FIG. 4.

Figure 3A:
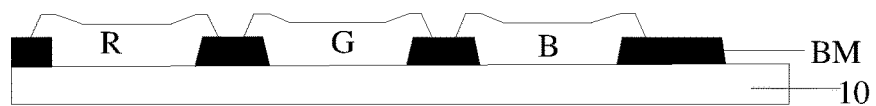
FIG. 3*a* is a schematic view showing the structure of a display substrate on which a film layer is not yet formed.

First, the structure of the display substrate on which the film layer is not formed is shown in FIG. 3a, in which a black matrix BM and a color resist layer RGB are formed on the substrate 10. Herein, the side of the substrate 10 is the side on which the black matrix BM and the color resist layer RGB are formed. In addition, the color resist layer RGB and the black matrix BM adjacent thereto are overlapped in the edge regions.

Figure 3B:
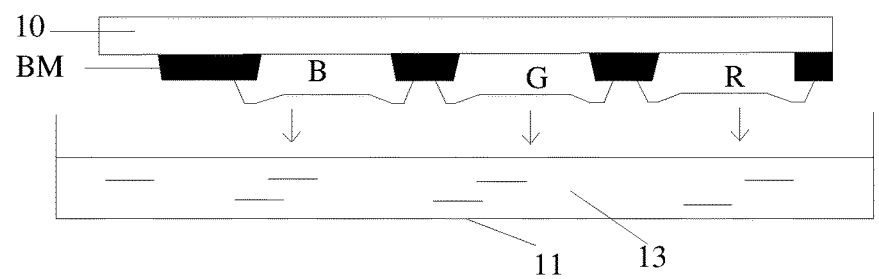
FIG. 3*b* is a schematic view showing a state in which the side of the display substrate as shown in FIG. 3*a* is immersed in the curable liquid.

The substrate 10 as shown in FIG. 3a is turned 180 degrees so that the side of the substrate 10 on which the film layer to be formed is immersed in the curable liquid 13, as shown in FIG. 3b.

Figure 3C:
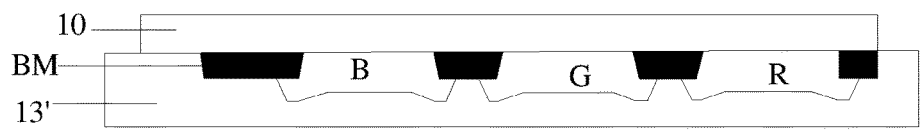
FIG. 3*c* is a schematic view showing a state in which the curable liquid is subjected to curing treatment and the container is removed.

As shown in FIG. 3c, the curable liquid 13 is subjected to a curing treatment. The curing treatment includes, but is not limited to, heat curing, light curing, and the like. In one specific embodiment, the conditions for the heat curing are, for example, heating at 230° C. for 30 minutes. In another specific embodiment, the photoinitiator is first added to the curable liquid, which is then irradiated with ultraviolet light (wavelength below 400 nm) from above, so that the portion above the separator is irradiated with ultraviolet light to achieve the purpose of curing.

In a specific embodiment of the present disclosure, the curable liquid 13 is a curable adhesive, examples of which include, but are not limited to OC adhesive. A specific example of the OC adhesive material is polyacrylate resin.

In a particular embodiment of the present disclosure, the container is made of a metal alloy material.

Because the OC adhesive and BM, RGB are resin, which belong to the same type of polymer, the molecular sizes thereof are similar, and mutual adhesion is greater, so the adhesion between OC adhesive and other materials on the substrate 10 (for example, black matrix BM and color resist layer RGB) is better. As the container is made of the metal alloy material, the property (such as physical properties, molecular structure and the like) of which is far from that of polymer resin, so the adhesion is poor. Therefore, they could be easily and quickly peeled off from the container 11 after curing, and firmly adhered to the black matrix BM and the color resist layer RGB.

After the curing treatment, the container 11 is removed, and the film layer 13' is formed on the side of the substrate 10 on which the film layer to be formed. Since the bottom of the container 11 is flat, the surface of the formed film layer 13' which is opposite to the substrate 10 has the corresponding flatness with the bottom of the container 11, that is, it also flat and can satisfy the requirement of uniformity of the thickness of the display substrate 10.

Figure 3D:
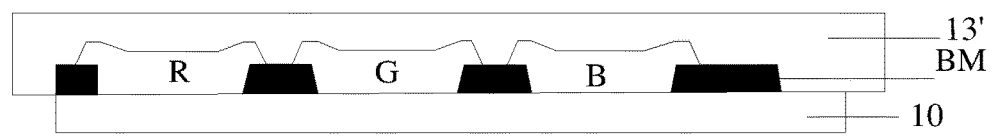
FIG. 3*d* is a schematic diagram of a state in which the substrate as shown in FIG. 3*c* is turned 180°.

For example, after step S3, it further comprises step S4, the substrate is turned 180 degrees (as shown in FIG. 3d), followed by a subsequent process. By doing so, it is convenient to continue to form other film layers on the surface of the film layer 13', which facilitates large-scale production of the process.

Figure 4:
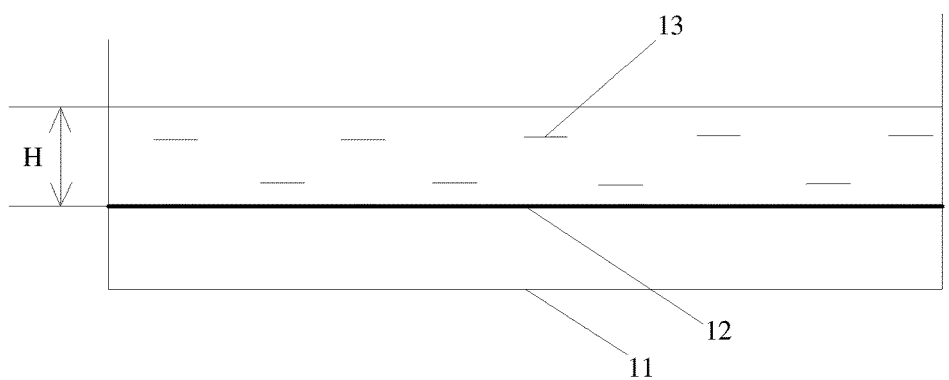
FIG. 4 is a schematic structural view of a container according to an embodiment of the present disclosure.

As shown in FIG. 4, the container 11 is provided with an adjustable separator 12 according to the present disclosure, and the position of the separator 12 in the container 11 can be adjusted, so as to adjust the depth H of the curable liquid contained in the container. The curable liquid 13 is injected into the container 11 after the adjustment is finished. It is to be noted that the depth H is set in accordance with the thickness of the desired film in practice, which is generally equal to the thickness of the desired film, but if the volume of the curable liquid is changed after curing, the depth H should be set considering the change. It is to be noted that the preparation method of the display substrate provided by the present embodiment can be applied not only to the preparation of the color filter substrate but also to the preparation of other substrates (e.g., array substrates).

As described above, according to the manufacturing method of the display substrate of the present disclosure, the film layer 13' is formed by the above steps S1 to S3, the flatness of the surface of the film layer 13' opposite to the substrate 10 is consistent with the flatness of the bottom of the container 11. Therefore, the uniformity of the film thickness of the formed display substrate is high.

The existing flatness is generally above 0.5 um, and in order to achieve the flatness requirements, it is usually to improve the flatness by increasing the OC film thickness. As a result, the cost is increased. The present disclosure is only necessary to ensure the flatness of the bottom of the container, and the flatness is generally 0.3 um or less According to the manufacturing method of the display substrate provided by the present disclosure, by means of immersing a side of a substrate into a container which is positioned horizontally and which contains a curable liquid, and the bottom of which is flat, wherein the side of the substrate is parallel to the bottom of the container in the horizontal direction, then by means of performing cure treatment of the curable liquid to form the corresponding film, the flatness of the surface of the formed film layer opposite to the substrate is consistent with the flatness of the bottom of the container, thus satisfying the requirement of flattening. Therefore, the uniformity of the film thickness of the formed display substrate is high.

The present disclosure also provides a display substrate obtained by the above method for manufacturing a display substrate according to the present embodiment.

Since the display substrate is prepared by the above method for manufacturing a display substrate according to the present embodiment, the uniformity of the film thickness of the display substrate is high.

The present disclosure also provides a display device including the display substrate according to the present embodiment.

In particular, the display device includes a liquid crystal display device.

Since the display device provided by the present embodiment applies the display substrate according to the above embodiment, the yield of the display device is high.

It is to be understood that the above embodiments are merely illustrative embodiments for the purpose of illustrating the principles of the invention, but the invention is not limited thereto. It will be apparent to those skilled in the art that various changes and modifications can be made therein without departing from the spirit and essence of the invention, which are also considered to be within the scope of the present invention.

The invention claimed is:

1. A method for manufacturing a display substrate comprising:
   providing a container, which is positioned horizontally and which contains a curable liquid, and a bottom of which is flat in a horizontal direction;
   immersing a side of the substrate parallel to the bottom of the container into the curable liquid; and
   performing curing treatment of the curable liquid until the curable liquid is solidified on the side of the substrate to form a film layer, characterized in that,
   the container is provided with an adjustable separator:
   the step of providing a container, which is positioned horizontally and which contains a curable liquid comprises, providing an empty container;
   adjusting a position of the separator in the container, so as to adjust a depth of the curable liquid contained in the container, and
   injecting the curable liquid into the container after being adjusted.

2. The method for manufacturing a display substrate according to claim 1, characterized in that, a black matrix and a color resist layer are formed on the substrate;
   the side of the substrate being the side where the black matrix and the color resist layer are positioned.

3. The method for manufacturing a display substrate according to claim 2, characterized in that, the color resist layer and the black matrix adjacent thereto are overlapped in edge regions.

4. The method for manufacturing a display substrate according to claim 1, characterized in that, the curable liquid is a curable adhesive.

5. The method for manufacturing a display substrate according to claim 4, characterized in that, the step of performing curing treatment of the curable liquid includes:
   performing heat treatment of the curable liquid so as to be solidified.

6. The method for manufacturing a display substrate according to claim 1, characterized by further comprising:
   after the step of performing curing treatment of curable liquid until the curable liquid is solidified on the side of the substrate to form a film layer, turning the substrate 180 degrees, followed by a subsequent process.

7. A display substrate, characterized in that, the display substrate is obtained by the manufacturing method according to claim 1.

8. A display device comprising a display substrate, characterized in that, the display device uses the display substrate according to claim 7.

9. The display device according to claim 8, characterized in that, the display device includes a liquid crystal display device.

* * * * *